Nov. 6, 1956

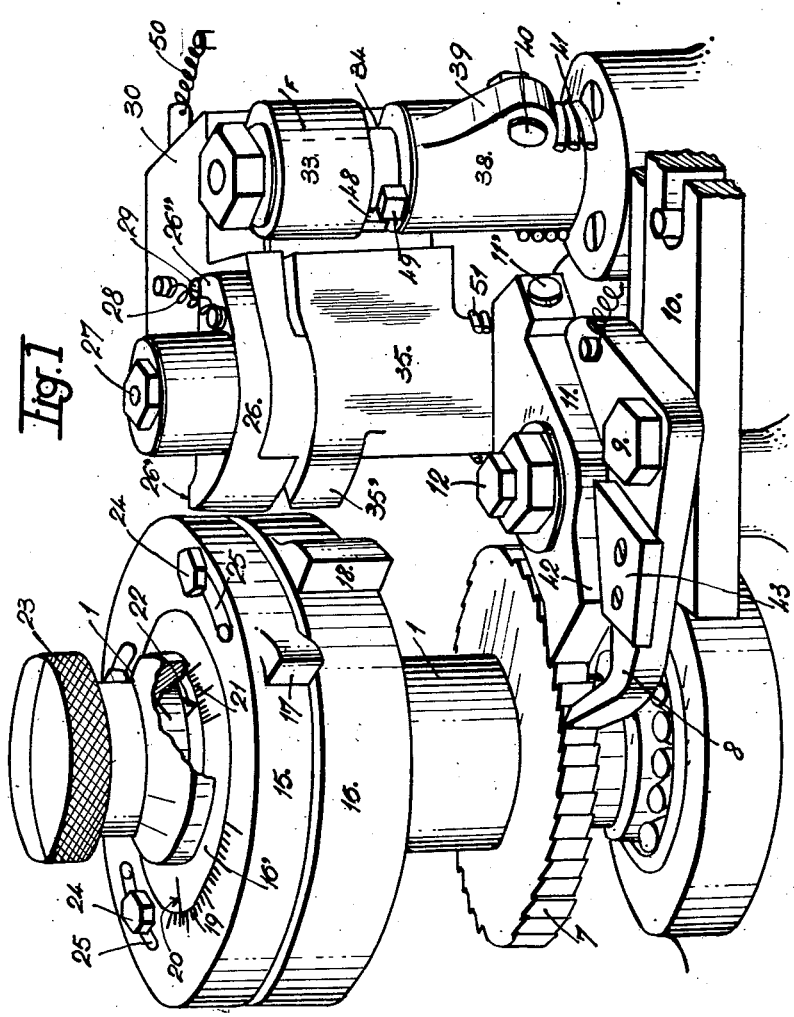

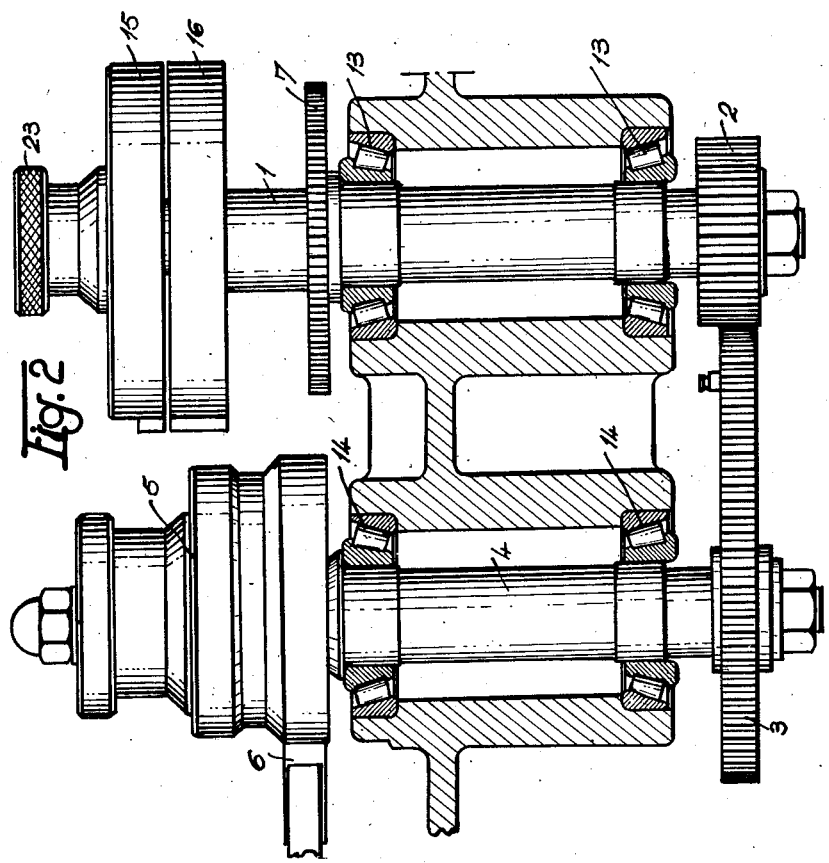

P. E. RENOUX 2,769,186

CONTROL MEANS FOR CUTTING A THREAD IN
PLURAL SUCCESSIVE PASSES

Filed July 8, 1953

Inventor
Pierre E. Renoux
by Malcolm W. Fraser
attorney

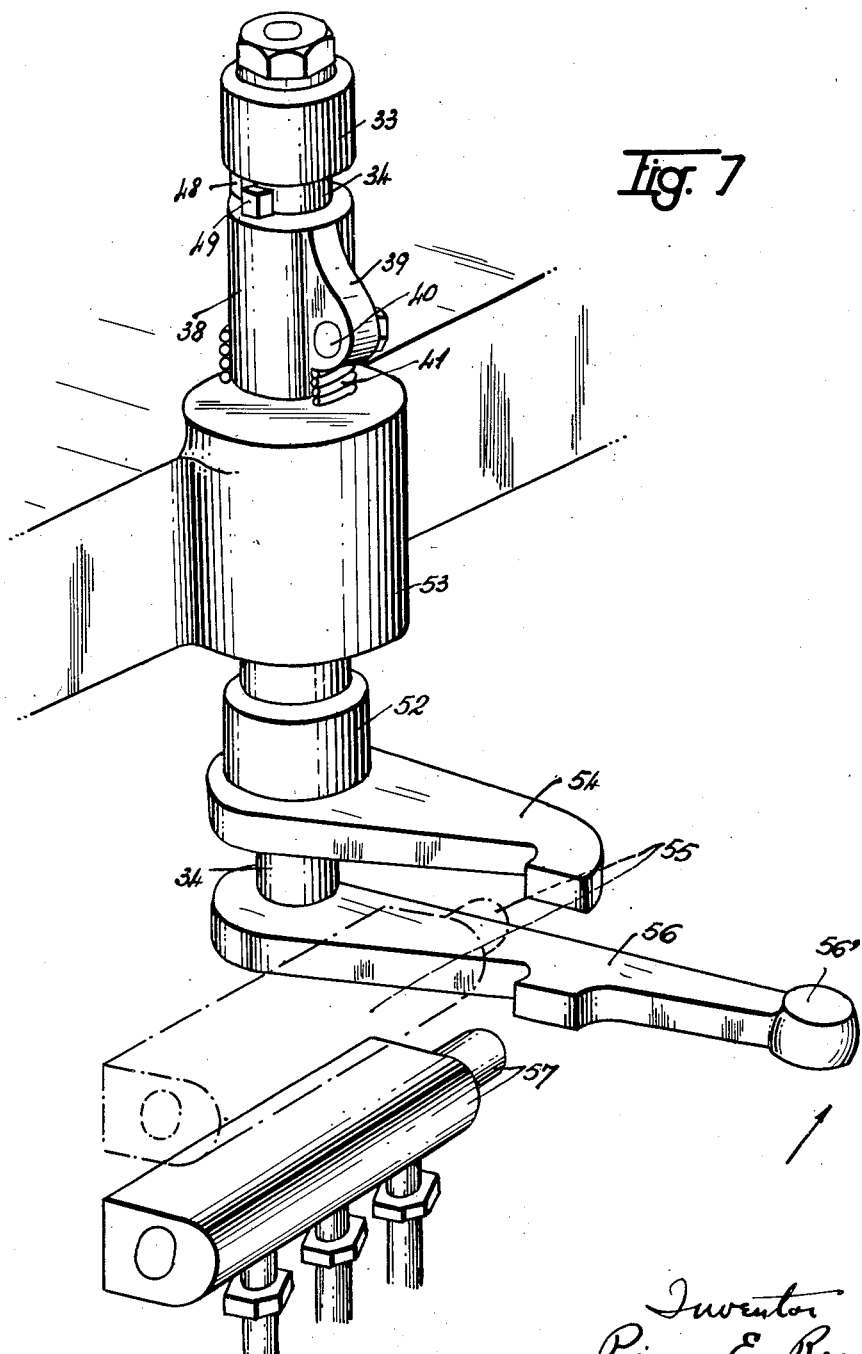

United States Patent Office 2,769,186
Patented Nov. 6, 1956

2,769,186

CONTROL MEANS FOR CUTTING A THREAD IN PLURAL SUCCESSIVE PASSES

Pierre Edouard Renoux, Argenteuil, France, assignor to Societe Anonyme dite: Cri-Dan, Paris, France, a French company Application July 8, 1953, Serial No. 366,663

Claims priority, application France August 7, 1952

6 Claims. (Cl. 10—101)

My invention has for its object thread-cutting machines wherein the tool executes a series of operative steps similar to those exerted in an automatic or semi-automatic slide lathe which produces the thread by means of successive cuts that are repeated a predetermined number of times, the machine stopping automatically after said number of cuts, and its different parts returning then into their starting position.

The invention has more particularly for its object a thread-cutting machine wherein the gradual progression of the tool-holder carriage is obtained through the agency of a cam the rotation of which is produced by a catch-and-ratchet system.

Hitherto, machines of this type executing a plurality of cuts produced the thread by means of a single tool, but it has been found, in accordance with the present invention, that it would be of advantage to begin by removing the major part of the metal to be removed from the work-piece by resorting to a first roughing-out tool for executing a comparatively large number of cuts after which the machine is stopped or the roughing-out tool released, so as to allow the substitution for said roughing-out tool of a finishing tool which serves then for giving the outline of the thread the desired shape through the remainder of the cuts.

The roughing-out tool may assume a sturdier shape than the finishing tool, which bestows the latter with a longer life.

The present invention has also for its object a mechanism for executing in succession two series of cuts, the number of which in each series is predetermined, to wit: a series of roughing-out cuts, followed by a first stoppage of the machine, or simply by the holding of the roughing-out tool in a released position while its gradual engagement with the work-piece is interrupted, after which the series of finishing cuts is executed, to be followed by a stoppage of the machine and a return of its parts to their starting position.

Applicant's improved mechanism is characterized by two superposed plates the relative angular positions of which are adjusted as desired, with reference to a rotary spindle driving them along with it, said spindle carrying the ratchet wheel of the ratchet system controlling the cam or the like member producing the gradual progression of the tool-holding carriage.

One of these plates is adapted to control, after a predetermined number of cuts, i. e. the roughing-out cuts, the operation of a first releasing mechanism playing the part of machine-stopping means or of means for stopping the transverse movements of the roughing-out tool, so as to hold the latter in its inoperative released position, by means of any suitable transmission, whether mechanical, electric, pneumatic, hydraulic or the like.

The second plate is adapted to control, after a predetermined number of cuts, i. e. the series of finishing cuts, the operation of a second releasing mechanism which, on one hand, stops the machine through action of any suitable mechanical, electric, pneumatic or hydraulic transmission on the clutch connecting the machine with the power unit, and on the other hand, said second mechanism is adapted to return into its starting position the ratchet system producing the gradual feed of the tool, this return being provided by shifting the catch and pawl of said system away from the ratchet wheel.

Each releasing mechanism is constituted by a pivoting lever provided with one or more projections adapted to engage the corresponding projection or projections on a rotary member urged by a spring or by a fluid-operated jack in a direction such that when the lever is moved so as to shift the contacting projections away from each other, the rotary member thus released is started moving, the energy of the spring or of the compressed fluid serving for the execution of the desired movement.

In a first embodiment, the first releasing mechanism produces the rotation of a spindle which provides for the disconnection and stoppage of the machine, whereas the second releasing mechanism produces on one hand the rotation of the same above-mentioned disconnecting spindle and, on the other hand, the rotation of a member shifting the catch and pawl away from the driving ratchet wheel in the mechanism producing the gradual feed of the tool, said shifting allowing said ratchet wheel to return into its starting position under the action of a return spring or of a jack.

In a second embodiment, the first releasing mechanism produces the rotation of a spindle which provides for the stopping in a released position of the transverse control mechanism for the tool, through action on distributors of fluid under pressure of which one controls the reciprocating movement of the tool engaging the work and receding thenafter, while the other distributor controls the gradual feed of said tool. The second releasing mechanism produces the rotation of a member urging the catch and pawl away from the ratchet wheel driving the mechanism controlling the gradual feed of the tool and, furthermore, it produces the disconnection and stoppage of the machine through the agency of a suitable transmission, whether mechanical, electric, pneumatic, hydraulic or the like.

The member rigid with the spindle that starts rotating under the control of the first releasing mechanism may carry a projection adapted, when the operator acts so as to oppose the releasing movement and produces a shifting of said member slightly beyond its original position of engagement, to engage a corresponding projection carried by the pivoting lever of the second releasing mechanism actuated by the second plate, this operative step being executed between the series of roughing cuts and the series of finishing cuts.

The two pivoting levers actuated by the two above mentioned plates may pivot round the same axis. Similarly, the rotary members released by said two pivoting levers may be coaxial.

The member urging the catch and pawl away from the ratchet wheel may be constituted by a rotary hub carrying a boss provided with an adjustable screw adapted to abut against the pawl of the catch mechanism and to shift said pawl away from the ratchet wheel, which pawl in its turn shifts away the catch driving said ratchet wheel.

Accompanying drawings, given by way of example and by no means in a limiting sense, illustrate two embodiments of the mechanism forming the object of the invention. In said drawings:

Fig. 1 is a perspective view of the mechanism which allows executing in succession the roughing-out and finishing cuts in a thread-cutting machine incorporating a cam having a variable eccentricity;

Fig. 2 is an elevational partly sectional view of the control means for said cam having a variable eccentricity;

Fig. 7 is a perspective view of a modification of the lower part of the mechanism, as required in the case of a machine incorporating a hydraulic control system; and, Fig. 8 is a perspective view of the lower part of the machine described in Figs. 1 to 6 inclusive, showing the disconnecting spring.

Figure 4:
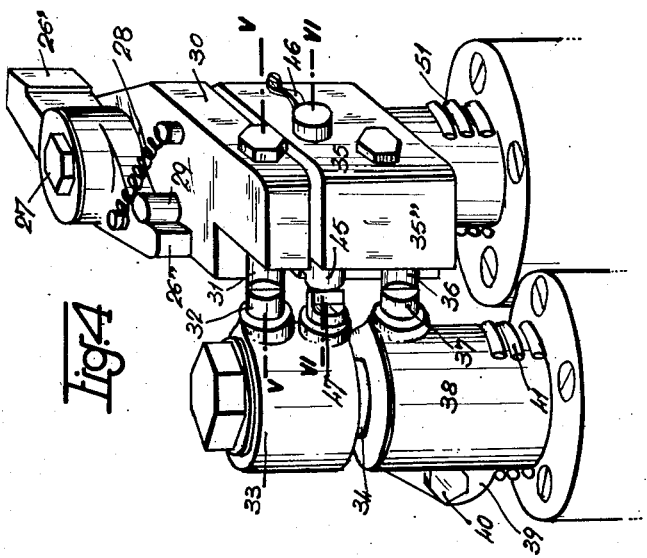
Fig. 4 is a perspective view of a part of the mechanism illustrated in Fig. 1, as seen sideways.

Turning to Figs. 1 and 2, 1 designates the tool-controlling spindle driving, through the agency of the toothed pinion 2 and of the toothed sector 3, the spindle 4 carrying the cam 5 of a variable eccentricity, acting through the pusher member 6 on the tool that is not illustrated.

The spindle 1 carries a ratchet wheel 7 actuated by a catch 8 pivotally secured at 9 to a sliding rod 10 assuming a reciprocating movement under the action of a shaft carrying the pitch cam. The mechanism for reciprocating rod 10 is disclosed in my copending application Serial No. 300,441, filed July 23, 1952. The pawl for the ratchet wheel 7 is shown at 11 and pivots round a pivot 12 rigid with the frame of the machine.

Roller bearings 13 and 14 are provided for revolubly carrying the spindles 1 and 4.

The ratchet-carrying spindle 1 also carries two plates 15 and 16, each provided along its periphery with an outwardly projecting tail-piece, 17, 18 respectively. The relative angular position of said plates with reference to the spindle 1 may be adjusted as required. To this end, the plate 15 carries a scale 19 and the hub 16' of the said plate 16 is provided with a reference mark 20 cooperating with the scale 19 on the plate 15 (Fig. 1), which allows suitably setting the plate 15 in any desired angular position with reference to the plate 16 in accordance with the selected number of finishing cuts, each subdivision on the scale 19 corresponding to one cut. On the other hand, the hub 16' on the plate 16 carries a scale 21 and the spindle 1 is provided with a cooperating reference mark 22 which allows giving the plate 16 any desired angular position with reference to the spindle 1, so as to obtain the selected total number of cuts, including the roughing-out cuts and the finishing cuts, each subdivision of the scale 21 corresponding to one cut.

When the plates 15, 16 have been suitably set in the desired angular position, the plate 16 may be rigidly secured to the spindle 1 by screwing down the nut 23 having a knurled head and similarly, the plate 15 is rigidly secured to the plate 16 through bolts 24 engaging arcuate slots 25 in the plate 15 and screwed into the plate 16.

The plate 15 controls a lever 26, each time its tail piece 17 engages the end 26' of said lever which is pivotally secured to a spindle 27. The opposite arm 26" of the lever 26 is urged normally by a spring 28 against a stud 29 carried by another lever 30 pivotally secured to the same spindle 27. The actuation of the lever 26 by the projecting tail-piece 17 on the plate 15 produces thus a rotary movement of the lever 30. The latter carries a projection 31 which holds normally in a predetermined position a projection 32 (Fig. 4) on a hub 33 rigid with a spindle 34 controlling the disconnection and stoppage of the machine through any suitable transmission that needs not be described, since it forms no part of the invention.

Figure 6:
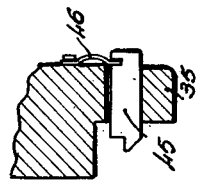
Fig. 6 is a partial sectional view through line VI—VI of Fig. 4.
Figure 3:
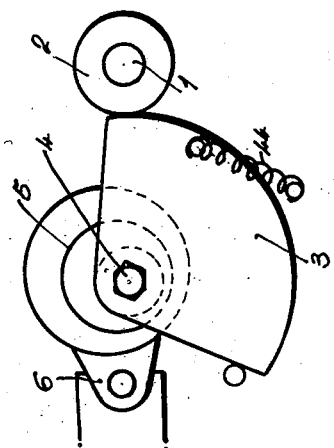
Fig. 3 is a view thereof from below.
Figure 5:
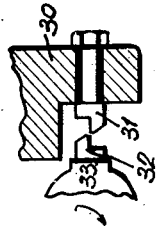
Fig. 5 is a partial cross-sectional view through line V—V of Fig. 4, the pivoting lever being assumed to have been previously moved, said view showing the means for interengaging two projections facing each other, said means being applicable to any other pair of cooperating projections in the machine.
Figure 8:
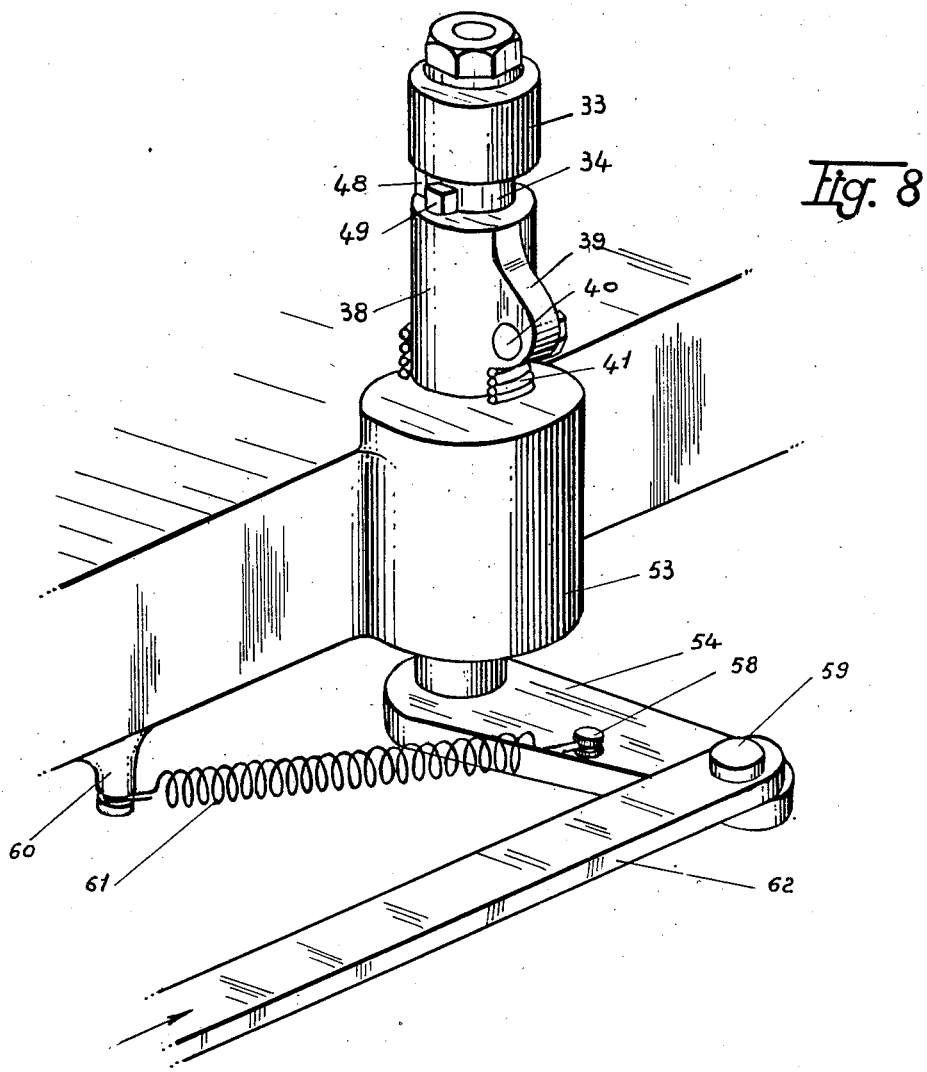

The tail-piece 18 on the plate 16 has a breadth such and is located in a manner such that it may simultaneously control the rotation of the above described lever 26 and that of a lever 35 pivotally secured round the same spindle 27 (Fig. 1) when said tail-piece engages the ends 26' and 35' of both said levers. The opposite end 35" of the lever 35 carries a projection 36 similar to the projection 31 (Fig. 4) and which holds in a predetermined position a projection 37 carried by a hub 38 revolubly mounted on the above mentioned spindle 34. Said hub 38 carries a boss 39 including an adjustable screw 40. When the lever 35 is shifted by the tail-piece 18 of the plate 16, the hub 38 is released through the disengagement between the projections 36 and 37; under the action of a spring 41, said hub assumes an angular movement until the adjustable screw 40 on the boss 39 meets the end 11' (Fig. 1) of the pawl 11 and releases the latter with reference to the ratchet wheel 7. The pawl 11 also raises, through the agency of cooperating bosses 42, 43, the catch 8 away from said ratchet wheel 7 which is now completely released. This provides the simultaneous release of the toothed sector 3 driving the cam 5, said sector being returned by a spring 44 into its starting position (Fig. 3). The lever 35 carries a second projection 45 which is normally urged by a spring 46 (Figs. 5 and 6), so as to engage a cooperating projection 47 carried by the hub 33 (Fig. 14), said projection 45 being slightly shifted with reference to the projection 36 on the lever 35.

Lastly, the hub 33 carries a stud 48 which may engage a stud 49 carried by the hub 38 (Fig. 1).

The levers 26, 30 and 35 are submitted to the action of corresponding springs 28, 50 and 51.

The operation of the arrangement is as follows:

The plate 15 acting solely through the agency of the lever 26 on the disconnection of the machine as provided by the spindle 34, stops the machine after a predetermined number of cuts have been made without the cam 5 being returned to its starting position. In contradistinction, the plate 16 which acts both on the levers 26 and 35, produces simultaneously the stoppage of the machine through the agency of the spindle 34 and the return into its starting position of the cam 5 through the release of the hub 38 so that the machine is then ready for cutting a further thread.

It is thus apparent that, by suitably positioning the plates 15 and 16 with reference to each other, as provided by the cooperation between the scales 19 and 21 and the corresponding reference marks 20 and 22, and by rigidly securing said plates in their adjusted positions, it is possible to produce a first stoppage of the machine by the plate 15 before the complete number of cuts required for executing the thread is produced; this first series of cuts may serve advantageously for the roughing-out of the thread with a suitable tool. The remaining cuts serve for finishing the thread with a second tool, the substitution of the finishing tool for the roughing-out tool being executed either by hand or automatically through any suitable means which do not form part of the present invention.

When the machine has completely executed the desired thread in a work-piece, the catch 11 and the pawl 8 are raised by the pressure exerted by the adjustable screw 40 carried by the boss 39 on the hub 38, submitted to the action of the spring 41 on the end 11' of the pawl 11; on the other hand, the hub 33, that has also been released, is submitted to the action of a disconnecting spring 61 and has rotated at this moment in the direction of the arrow F by a fraction of a revolution which provides for the disconnection of the machine. Disconnecting spring 61 is connected by an anchor 60 and stud 58 on lever 54 on the lower end of spindle 34, thus biasing spindle 54 and hub 33 in the direction of arrow F. The spindle 1 has returned, on the other hand, into its starting position under the action of the spring 44 cooperating with the toothed sector 3 and of the variable cam 5 as provided by the engagement of the toothed sector 3 with the pinion 2. The machine is thus ready for further operation.

When the operator wishes to start the machine again, he acts, through the agency of a link 62 connected by pivot 59 to the lever 54, on the spindle 34 which he causes to rotate so as to produce a rotation of the hub 33 in a direction opposed to that of the arrow F, until the projection 32 on said hub engages the projection 31 on the lever 30. This rotary movement drives the hub 38 through the agency of the cooperating studs 48 and 49 (Fig. 7) and produces the engagement of the projection 37 on the hub 38 with the projection 36 on the lever 35. This movement also produces the tensioning of the spring 41 and the release of the catch 8 and of the pawl 11, both of which reengage the ratchet wheel 7.

To each cut corresponds a reciprocation of the catch 8 controlled by the sliding rod 10 and consequently, a progression by one tooth of the ratchet wheel 7.

When the desired number of roughing-out cuts, which is equal to the total number of cuts minus the number of finishing-cuts, has been executed, the tail-piece 17 of the plate 15 engages the lever 26 and produces a stoppage of the machine through the agency of the lever 30, of the projections 31 and 32 which disengage each other, and of the hub 33 which is released and revolves in the direction of the arrow F and disconnects the machine.

The operator then substitutes one tool for another and reengages the machine. The hub 38 has not moved and this reengagement through action on the spindle 34 produces merely a rotation of the hub 33 in a direction opposed to the direction of the arrow F since the two studs 48 and 49 are now spaced with reference to each other, so that the hub 38 is not shifted. But since the lever 30 has been urged away from the projection 32, the latter is no longer engaged by the projection 31. It is, therefore, necessary for the operator to shift slightly further the hub 33 so that its projection 47 may reengage the projection 45 on the lever 35 in a direction opposed to the arrow F. The machine executes then the desired number of finishing cuts which number corresponds to the angular spacing between the tail pieces 17 and 18 on the plates 15 and 16, respectively.

When the tail piece 18 engages the ends of the levers 35 and 29, it produces on one hand, through the agency of the lever 30 and of the hub 33, which latter is started rotating in the direction of the arrow, the disconnection of the machine in the manner disclosed precedingly and, on the other hand, it acts through the lever 35 on the hub 38 which is released and is shifted angularly by the spring 41, so that the adjustable screw 40 on said hub produces the shifting of the pawl 11 and of the catch 8 and consequently, the return into its starting position of the cam 5 as described hereinabove.

Fig. 7 is a view of the lower section of the mechanism illustrated in Figs. 1 to 6. In this modification, the spindle 34 rigidly carries, as precedingly, the hub 33, and the hub 38 is, as precedingly, also revolubly carried by said spindle. But, in the case illustrated in Fig. 7, the hub 38 is rigid with a tubular extension 52 surrounding the spindle 34 and passing through a bearing 53. Said tubular extension 52 carries a lever 54 acting on the disconnection and stoppage of the machine through any suitable electric or the like transmission.

The spindle 34 extends downwardly beyond the lever 54 so as to carry another lever 56 adapted to control a valve 57 controlling in its turn the hydraulic system to cut off, when required, the admission of compressed fluid into the cylinders controlling respectively the reciprocation of the tool into and away from the workpiece, and the ratchet system producing the gradual feed of the tool. Both cylinders are connected with a fluid container and the tool holder carriage is urged into its released position by corresponding return means. The lever 56 may be controlled through its end 56' which the operator may shift in the direction of the arrow, so as to set the tool-feeding mechanism back into conditions for which it is ready to start again.

What I claim is:

1. In a thread-cutting machine for machining a piece of work, including a tool holder, a cam controlling the transverse movements of the tool holder and a ratchet system controlling the rotation of the cam, the provision of a control mechanism comprising two coaxial superposed plates, a spindle carrying said plates, and controlled by the ratchet system, a first projection rigid with the first plate, an auxiliary spindle, a first lever pivotally mounted on said auxiliary spindle, a spring urging said lever into a predetermined angular setting, said lever being urged away from said setting when engaged by the first projection at a point of the travel of the latter, a second lever pivotally mounted on the same auxiliary spindle and the angular movements of which between inoperative and operative positions are controlled by those of the first lever, a control spindle controlling a function of the machine whereby the tool may be modified, a first member rigid with said control spindle and normally engaged by the second lever, a disconnecting spring urging said first member and control spindle into their operative positions upon release of the first member by the second lever after the first projection has shifted the first lever, a second projection carried by the second plate, angularly shifted with reference to the first projection and also adapted to act at a point of its travel on the first lever in opposition with the corresponding spring, a third lever pivotally mounted on the auxiliary spindle and controlled by the second projection, a spring urging the third lever into its operative position, the second projection being adapted to urge the third lever away from its operative position against the action of the spring, a second member revolubly carried by the control spindle and normally held fast by the third lever when in its operative position, a spring urging said second member into its operative position when released by the third lever, and means whereby the second member, when in its operative position, controls the ratchet system to return same into its starting position.

2. In a thread-cutting machine for machining a piece of work, including a tool holder, a cam controlling the transverse movements of the tool holder and a ratchet system controlling the rotation of the cam, the provision of a control mechanism comprising two coaxial superposed plates, a spindle carrying said plates, and controlled by the ratchet system, a first projection rigid with the first plate, an auxiliary spindle, a first lever pivotally mounted on said auxiliary spindle and adapted to move across the path of the first projection, a spring urging said lever into a predetermined angular position, said first lever being urged away from said position when the first projection, having reached a predetermined point of its travel, engages said lever, a second lever pivotally mounted on the same auxiliary spindle and the angular movements of which between its extreme positions are controlled by those of the first lever, a control spindle controlling a function of the machine whereby the tool may be modified, a first member rigid with said control spindle, a first stud on said first member, a second stud rigid with the second lever engaging the first stud as long as said second lever is not shifted away from one extreme position, a disconnecting spring urging said first member and control spindle into their operative disconnecting position upon release of the first member by the second lever through disengagement of their studs, a second projection carried by the second plate, angularly shifted with reference to the first projection and also adapted to act at a point of its travel on the first lever in opposition with the corresponding spring, a third lever pivotally mounted on the auxiliary spindle and controlled by the second projection, a spring urging the third lever into an operative position, the second projection being adapted to urge the third lever away from its operative position against the action of the last mentioned spring, a second member revolubly carried by the control spindle, a third stud on said second member, a fourth stud on the third spring-urged lever adapted to engage the third stud as long as the third lever is not released by the corresponding projection, a further spring urging said second member into its operative position when released by the third lever, and means whereby the second member, when in its operative position, controls the ratchet system to return it into its starting position, a fifth stud on the first member carried by the control spindle and a sixth stud carried by the third lever and adapted to engage the fifth stud, whenever the machine, after disengagement through operation of the first member, has been reengaged.

3. In a thread-cutting machine for machining a piece of work, including a tool holder, a cam controlling the transverse movements of the tool holder and a ratchet wheel controlling the rotation of the cam, and a pawl and a catch cooperating with the ratchet wheel, the provision of a control mechanism comprising two co-axial superposed plates, a spindle carrying said plates, said ratchet wheel being rigid with said spindle, a first projection rigid with the first plate, an auxiliary spindle, a first lever pivotally mounted on said auxiliary spindle and adapted to move across the path of the first projection, a spring urging said lever into a predetermined angular position, said lever being urged away from said position when the first projection, having reached a predetermined point of its travel, engages said lever, a second lever pivotally mounted on the same auxiliary spindle and the angular movements of which between its extreme positions are controlled by those of the first lever, a control spindle, a first member rigid with said control spindle, a first stud on said first member, a second stud rigid with the second lever engaging the first stud as long as said second lever is not shifted away from one extreme position, a disconnecting spring urging said first member and control spindle into their operative disconnecting position upon release of the first member by the second lever through disengagement of their studs, means whereby said first member, when released, operates through the control spindle to provide a control motion for stopping transverse movements of the tool-holder carriage, a second projection carried by the second plate, angularly shifted with reference to the first projection and also adapted to act at a point of its travel on the first lever in opposition with the corresponding spring, a third lever pivotally mounted on the auxiliary spindle and controlled by the second projection, a spring urging the third lever into an operative position, the second projection being adapted to urge the third lever away from its operative position against the action of the last mentioned spring, a rotary hub, a third stud on said hub, a fourth stud on the third lever adapted to engage the third stud and to release same when the third lever is released by the second projection, a return spring urging said hub into its operative position, a boss carried by said hub member, an adjustable stop carried by said boss and adapted, when the hub is in its operative position, to engage the pawl of the ratchet system to urge said pawl away from the ratchet wheel and to constrain said pawl also to shift the catch away from the ratchet wheel, to allow the latter to return into its starting position, means responsive to the motion for said hub when released and adapted to produce the stopping of the machine, a fifth stud carried by the first member on the control spindle and a sixth stud on the third lever adapted to engage the fifth stud at the moment of the reengagement of the machine between the roughing-out cuts and the subsequent finishing cuts.

4. In a thread-cutting machine for machining a piece of work, including a tool, a tool-holder and means controlling the transverse movements of the tool-holder, the provision of a control-mechanism comprising two plates, means for causing said plates to revolve in synchronism with the means controlling the movements of the tool-holder, means for adjusting the angular setting of said plates in their starting positions, a first projection rigid with the first plate, a first lever pivotally mounted on a stationary point and adapted to cross the path of said first projection, a spring urging said lever into a predetermined operative angular setting, said lever being urged away from said position when engaged by the first projection shifted by the rotation of its plate into a predetermined angular position, a system controlling a function of the machine and including a first member, means controlled by the first lever whereby the said first member is normally held fast in an inoperative position as long as the first lever is in its operative angular setting, a disconnecting spring urging said first member and control system into their operative positions upon release of the first member by last mentioned means, upon actuation of the lever by the first projection, a second projection carried by the second plate, adapted to act at a point of its angular movement on the first above mentioned lever in opposition with the corresponding spring, a further lever pivotally mounted on a stationary point and controlled by said second projection, a spring urging said further lever into an operative position, the second projection being adapted to urge said further lever away from its operative position against the action of last mentioned spring, a second revoluble member normally held fast by the further lever when in its operative position, a further spring urging said second member into its operative position when released by the further lever and means whereby the second member, when urged into its operative position, returns into their starting positions the means controlling the transverse movements of the tool-holder and thereby also said tool-holder.

5. In a machine tool, including a tool holder, means for feeding said tool holder longitudinally, means for giving said tool-holder a linear movement transverse to the longitudinal feed, a ratchet wheel controlling the transverse movements of said feeding means and means controlling said ratchet wheel, the combination of a spindle carrying said ratchet wheel, two superposed plates fitted on said spindle, means for adjusting the angular setting of each plate with reference to the spindle, means operating in response to predetermined angular rotation of the second plate, defined by its angular setting and executed in unison with the spindle and the ratchet wheel, for controlling a function of the machine tool to allow replacement of the tool and restarting of the machine, means operating in response to predetermined angular rotation of the first plate for effecting both the disconnection of the machine and the release of the driving means of the ratchet wheel with reference to the latter, and a spring returning the ratchet wheel into its starting position.

6. In a machine tool, including a tool holder, means for feeding said tool holder longitudinally to cut a thread, means for intermittently moving said tool holder transversely to the longitudinal feed at the end of each longitudinal pass, a ratchet wheel controlling the intermittent transverse movement of said feeding means, and means controlling said ratchet wheel, comprising a spindle carrying the ratchet wheel, two superposed plates fitted on said spindle, means for adjusting the angular setting of each plate with reference to the spindle, a projection on each of said plates, an auxiliary spindle parallel with the first spindle, a disconnecting control spindle parallel with the first two spindles, a spring urging the disconnecting control spindle into its operative machine-disconnecting position, ratchet release means rotatably mounted on the disconnecting control spindle, a first lever pivotally carried by the auxiliary spindle and being adapted to hold the ratchet release means in inoperative position, said first lever, when released, operating the ratchet release means, a second lever pivotally carried by the auxiliary spindle and being adapted to hold the disconnecting control spindle in inoperative position, said second lever, when released, operating to release the disconnecting control spindle, the projection on one of said plates being adapted to engage said second lever for releasing the same, the projection on the other of said plates being adapted to engage both of said levers for releasing the same, whereby, upon certain angular movement of said ratchet wheel from a starting position the projection on said one plate engages the first lever to operate the disconnecting control spindle and, upon certain other angular movement of said ratchet wheel, the projection on said other plate engages both said levers to operate both the disconnecting control spindle and the ratchet release means, and means for returning said ratchet wheel to its starting position upon release thereof.

References Cited in the file of this patent

UNITED STATES PATENTS 2,660,737     Escure _____ Dec. 1, 1953